(12) United States Patent
Yamashirodani

(10) Patent No.: US 9,507,959 B2
(45) Date of Patent: Nov. 29, 2016

(54) ELECTRONIC EQUIPMENT HAVING DISPLAY HAVING DIVIDED SCREEN AND CONTROL METHOD THEREOF

(71) Applicant: KYOCERA Document Solutions Inc., Osaka (JP)

(72) Inventor: Masayuki Yamashirodani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/555,595

(22) Filed: Nov. 27, 2014

(65) Prior Publication Data

US 2015/0150149 A1 May 28, 2015

(30) Foreign Application Priority Data

Nov. 27, 2013 (JP) .................................. 2013-244818

(51) Int. Cl.
*G06F 21/62* (2013.01)
*G06F 3/0486* (2013.01)
*G06F 21/60* (2013.01)

(52) U.S. Cl.
CPC ......... *G06F 21/6245* (2013.01); *G06F 3/0486* (2013.01); *G06F 21/608* (2013.01); *G06F 2203/04803* (2013.01)

(58) Field of Classification Search
CPC ............. G06F 21/608; G06F 21/6245; G06F 3/0486; G06F 2203/04803
See application file for complete search history.

(56) References Cited

U.S. PATENT DOCUMENTS

| 5,107,443 A | * | 4/1992 | Smith | .................... | G06Q 10/10 713/166 |
| 5,113,442 A | * | 5/1992 | Moir | ................... | G06F 21/6218 340/5.54 |
| 2007/0150827 A1 | * | 6/2007 | Singh | ...................... | G06F 3/011 715/773 |
| 2009/0106667 A1 | * | 4/2009 | Lyle | ...................... | G06F 3/0488 715/750 |
| 2009/0141895 A1 | * | 6/2009 | Anderson | ............... | G06F 21/84 380/252 |
| 2009/0150816 A1 | * | 6/2009 | Lyle | ....................... | G06F 3/038 715/771 |
| 2010/0293501 A1 | * | 11/2010 | Russ | ................... | G06F 3/04886 715/803 |
| 2011/0206285 A1 | * | 8/2011 | Hodge | .................... | G06F 21/84 382/224 |
| 2012/0154255 A1 | * | 6/2012 | Hinckley | ............... | H04N 7/142 345/1.3 |

FOREIGN PATENT DOCUMENTS

| JP | 2005-119138 A | 5/2005 |
| JP | 2006-251057 A | 9/2006 |
| JP | 2007-025156 A | 2/2007 |
| JP | 2013-143150 A | 7/2013 |

* cited by examiner

*Primary Examiner* — Robert Leung
(74) *Attorney, Agent, or Firm* — Hawaii Patent Services; Nathaniel K. Fedde; Kenton N. Fedde

(57) ABSTRACT

Provided is an electronic equipment, where divided display is performed and different user operates each screen, to protect privacy of showing contents. Accordingly, a permission user to whom access to privacy information made into a privacy protection object and its privacy information is permitted is set to privacy setup information. As for a privacy protection processing part, the divided display of the display screen of an operation part is performed, in case that a login user of a divided screen of one side differs from a login user of another divided screen of another side, when showing on one screen privacy information set as privacy setup information, an operation part is controlled to reduce a visibility of one screen.

8 Claims, 7 Drawing Sheets

| PRIVACY SETUP INFORMATION | |
|---|---|
| PRIVACY INFORMATION NAME | PERMISSION USER |
| CONFIDENTIAL BOX | USER A AND C |
| ADDRESS BOOK (CUSTOMER GROUP A) | USER A |
| ADDRESS BOOK (IN-COMPANY GROUP) | USER A, B, AND C |

Fig.6B

CONFIDENTIAL BOX — 81

DOCUMENT LIST

| DOCUMENT NAME | △ TIME | △ SIZE |
|---|---|---|
| 0001 A B C | 2013/10/29 13:12 | 100MB |
| 0002 D E F | 2013/10/30 10:00 | 80MB |
|  |  |  |
|  |  |  |
|  |  |  |

◁ 1/1 ▷

[PRINT] [DELETE] [DETAILS] [PREVIEW]
[CLOSE]

11:40

USER A

— 51

ADDRESS BOOK (IN-COMPANY GROUP) — 83

CONTACT LIST

| NAME | DETAILS |
|---|---|
| 0001 A B C | 03-1111-2222 |
| 0002 D E F | 03-3333-4444 |
| 0003 ・・・ | ・・・ |
| 0004 |  |
| 0005 |  |

◁ 1/5 ▷

[OK]

11:40

USER C

ELECTRONIC EQUIPMENT HAVING DISPLAY HAVING DIVIDED SCREEN AND CONTROL METHOD THEREOF

INCORPORATION BY REFERENCE

This application is based on and claims the benefit of priority from Japanese Patent Application No. 2013-244818 filed on Nov. 27, 2013, the contents of which are hereby incorporated by reference.

BACKGROUND

The present disclosure is related an electronic equipment having a display in which the screen is divided and the divided screens are shown.

A typical image forming apparatus includes an operation part that accepts a setup of an image forming apparatus, and instructions of operation. Some operation parts are provided with a touch-sensitive display. The display can show the state of an image forming apparatus, or there is displaying and an image formation situation or number of prints. The touch panel can setup, such as the function and magnification setup of double-side printing, a display in white, or the like, and a concentration setup.

When the operation part is used by one of users, other users who want to use an operation part need to wait for an operation part to be vacant. Then, the technology of performing the divided display of the screen of a display and accepting the instructions from a user on each divided screen is proposed.

SUMMARY

An electronic equipment of the present disclosure is the electronic equipment provided with the display in which a divided display is possible for the screen. Electronic equipment includes a privacy protection processing part. In case that while was divided and a privacy protection processing part differs in the login user of a screen, and the login user of the divided screen of another side, when showing on the one screen the privacy information set up previously, the display is controlled to reduce the visibility of the one screen from the normal displaying condition.

Also, a control method of the present disclosure is an electronic equipment provided with the display in which a divided display is possible for the screen. In case that while was divided and electronic equipment differs in the login user of a screen, and the login user of the divided screen of another side, when showing on the one screen the privacy information set up previously, the display is controlled to reduce the visibility of the one screen from the normal displaying condition.

BRIEF DESCRIPTION OF THE DRAWINGS

FIG. 4 is a figure showing an example of a setting of a privacy setup information shown in FIG. 3.

FIG. 6B is a figure showing an appearance of the screen by which privacy protection is performed.

DETAILED DESCRIPTION

Figure 1:
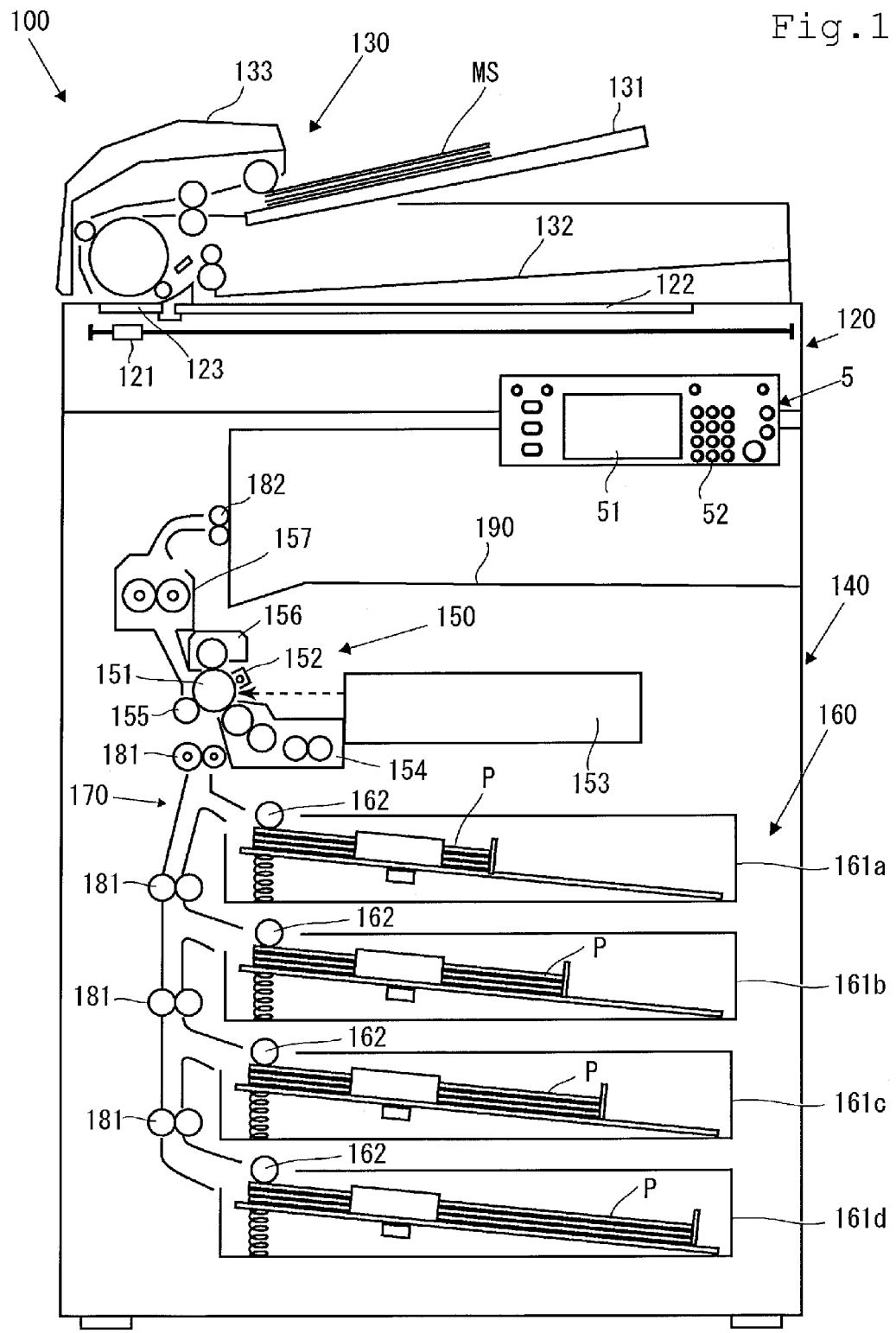
FIG. 1 is a mimetic diagram of a section of an image forming apparatus of the embodiment related to the present disclosure.

Subsequently, the embodiment of the present disclosure is described in detail with reference to drawings.

Image forming apparatus 100 that is an example of the electronic equipment of the embodiment of the present disclosure is a MFP that has a duplication function, a print function, a scanner function, or the like. Image forming apparatus 100 includes manuscript reading part 120, manuscript feeding part 130, and printing part 140 as refer to FIG. 1. Manuscript reading part 120 is allocated in the upper part of printing part 140. Manuscript feeding part 130 is allocated in the upper part of manuscript reading part 120. Operation part 5 is allocated in the front side of image forming apparatus 100. A setup and instructions of operation of image forming apparatus 100 are carried out by operation part 5.

Display 51 and manual operation button 52 are included in operation part 5. Manual operation button 52 includes a standing operation key and a screen separation key. The standing operation key includes a numeric keypad, a reset key, a stop key, a start key, or the like. The numeric keypad is a key for inputting numerical values, such as printing number of sheets. The reset key is a key for inputting the instructions that make setup information initialize. The stop key is a key for stopping copying operation or making the inputted numerical value eliminate. The start key is a key for inputting the output instruction that makes print operation start. The screen separation key is a key for inputting the instructions that divide the screen of display 51.

Display 51 includes the display panel and the touch panel. The display panel shows the various operation keys that accept an operational input. The touch panel is provided in the display surface of display 51. The touch panel detects the touch input by press of an operator's fingertip, a stylus, or the like. The touch panel outputs the signal corresponding to the position where the touch input was detected. Thereby, a touch panel accepts the operation to the operation key shown in display 51. As the display panel, for example, a liquid crystal display panel can use. As the touch panel, for example, a resistance film system, a capacitive sensing method, or the like. can be used.

Figure 2:
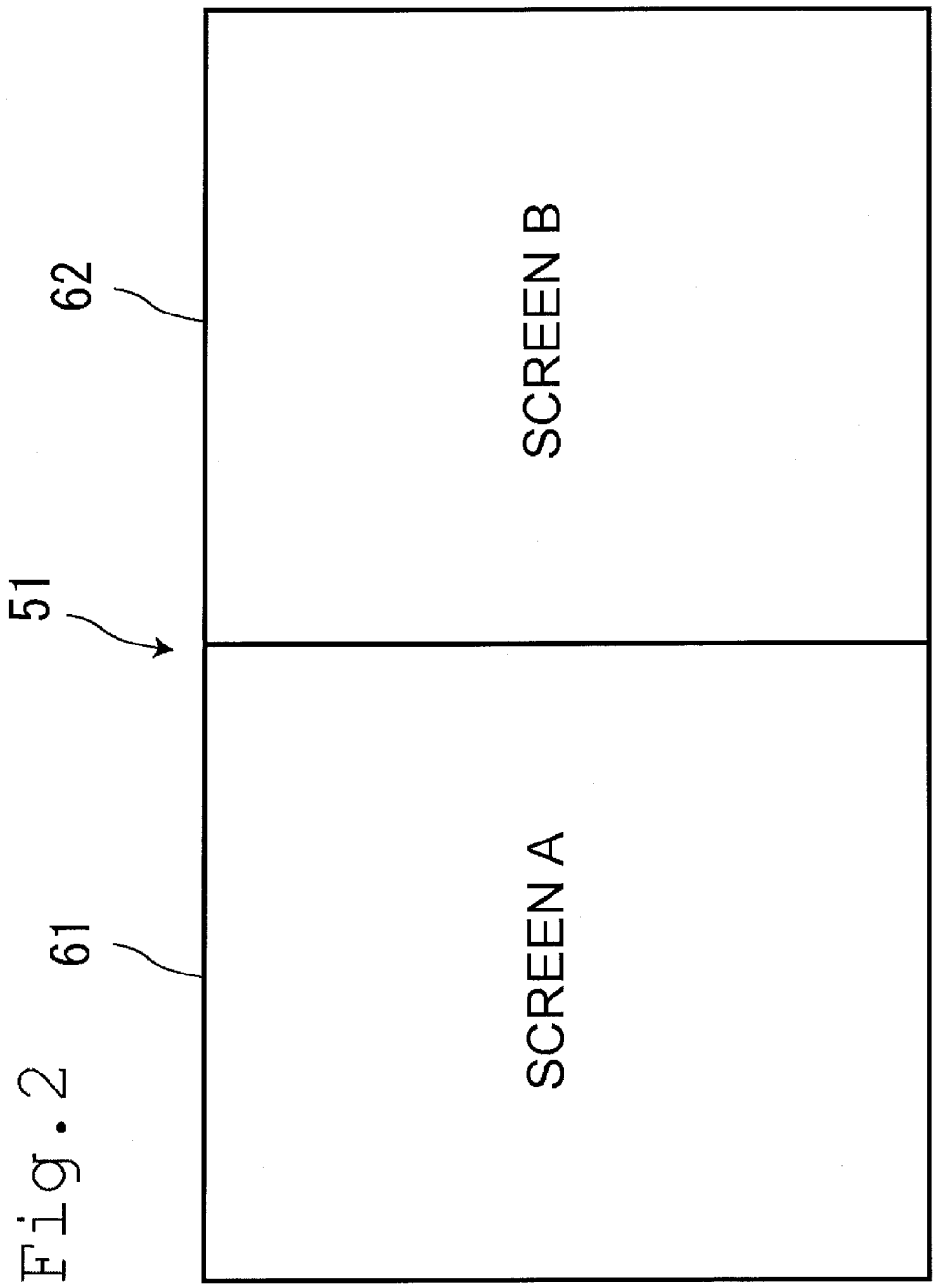
FIG. 2 is a figure showing a division display areas of a display shown in FIG. 1.

Display 51 will perform the divided display of the screen, when the screen separation key is pressed, and the key is unillustrated on Figs. FIG. 2 shows an example of a screen in the divided display on display 51. Here, the viewing area of display 51 is divided into two at right or left. Screen A is shown on left-hand side viewing area 61, and Screen B is shown on right-hand side viewing area 62. Display 51 can receive a user's login from each of Screen A and Screen B. Display 51 can accept the operation from a user simultaneously. Display 51, with the screen that accepted operation, can show a state of image forming apparatus 1 and an image formation situation or number of prints. Display 51 can carryout now various setup, such as the function and magnification setup of double-side printing, a display in white, or the like, and a concentration setup, as a touch panel. When the screen separation key is pressed, the screen of display 51 may be divided into up and down, and into three.

As shown in FIG. 1, manuscript reading part 120 includes scanner 121, platen glass 122, and manuscript reading slit 123. Scanner 121 has an exposure lamp, an image sensor, or the like, and can move to a transportation direction of manuscript MS by manuscript feeding part 130. Platen glass 122 is the manuscript stand comprised by transparent members, such as glass. Manuscript reading slit 123 has the slit formed in the transportation direction and orthogonal orientation of manuscript MS by manuscript feeding part 130.

Scanner 121 reads manuscript MS placed in platen glass 122, and scanner 121 is moved to the position that faces platen glass 122. Then, scanner 121 scans manuscript MS placed in platen glass 122, and scanner 121 reads manuscript MS and gets image data. In case that scanner 121 reads manuscript MS conveyed by manuscript feeding part 130, scanner 121 is moved to the position that faces manuscript reading slit 123. Then, via manuscript reading slit 123, scanner 121 reads manuscript MS synchronizing with the conveying action of manuscript MS by manuscript feeding part 130, and acquires image data.

Manuscript feeding part 130 includes manuscript mounting part 131, manuscript discharge part 132, and manuscript transport mechanism 133. Manuscript MS placed in manuscript mounting part 131 is sent to out one by one by manuscript transport mechanism. 133. Manuscript MS is conveyed in the position that faces manuscript reading slit 123 of manuscript reading part 120. Manuscript MS is discharged by manuscript discharge part 132 after that. Manuscript feeding part 130 is retractable. Therefore, the upper surface of platen glass 122 can be opened by raising manuscript feeding part 130 up.

In addition to image formation part 150, printing part 140 has feeding part 160, carrying path 170, conveying roller 181, ejection roller 182, and discharging tray 190 in the body. Discharging tray 190 in the body is provided in the ejection space in the body of image forming apparatus 100.

Feeding part 160 has sheet paper cassette 161 *a-d* and feed roller 162. A plurality of sheet paper cassette 161 *a-d* stores recording paper P, respectively. Feed roller 162 sends sheets of recording paper P to carrying path 170 from sheet paper cassette 161 *a-d* one by one. Feed roller 162, conveying roller 181, and ejection roller 182 function as a conveyance part, and recording paper P is conveyed. Recording paper P that sent to carrying path 170 with feed roller 162 is conveyed by image formation part 150 with conveying roller 181. Then, recording paper P recorded by image formation part 150 is led to ejection roller 182 and is outputted to discharging tray 190 in the body as printed matter. In the present embodiment, four sheet paper cassette 161 *a-d* are provided.

Image formation part 150 has photo conductor drum 151, charging part 152, exposure part 153, developing part 154, transfer part 155, cleaning part 156, and fixing part 157. Exposure part 153 is an optical unit. Exposure part 153 outputs light based on image data, and exposes photo conductor drum 151 electrified by charging part 152. Thereby, an electrostatic latent image is formed in the surface of photo conductor drum 151. Developing part 154 is a development unit that develops the electrostatic latent image formed in photo conductor drum 151 using the toner. Developing part 154 makes the toner image based on an electrostatic latent image form on photo conductor drum 151. Transfer part 155 makes transfer the toner image formed on photo conductor drum 151 of developing part 154 to recording paper P. Fixing part 157 heats recording paper P with that the toner image was transferred by transfer part 155. Thereby, recording paper P is fixed to a toner image.

Figure 3:
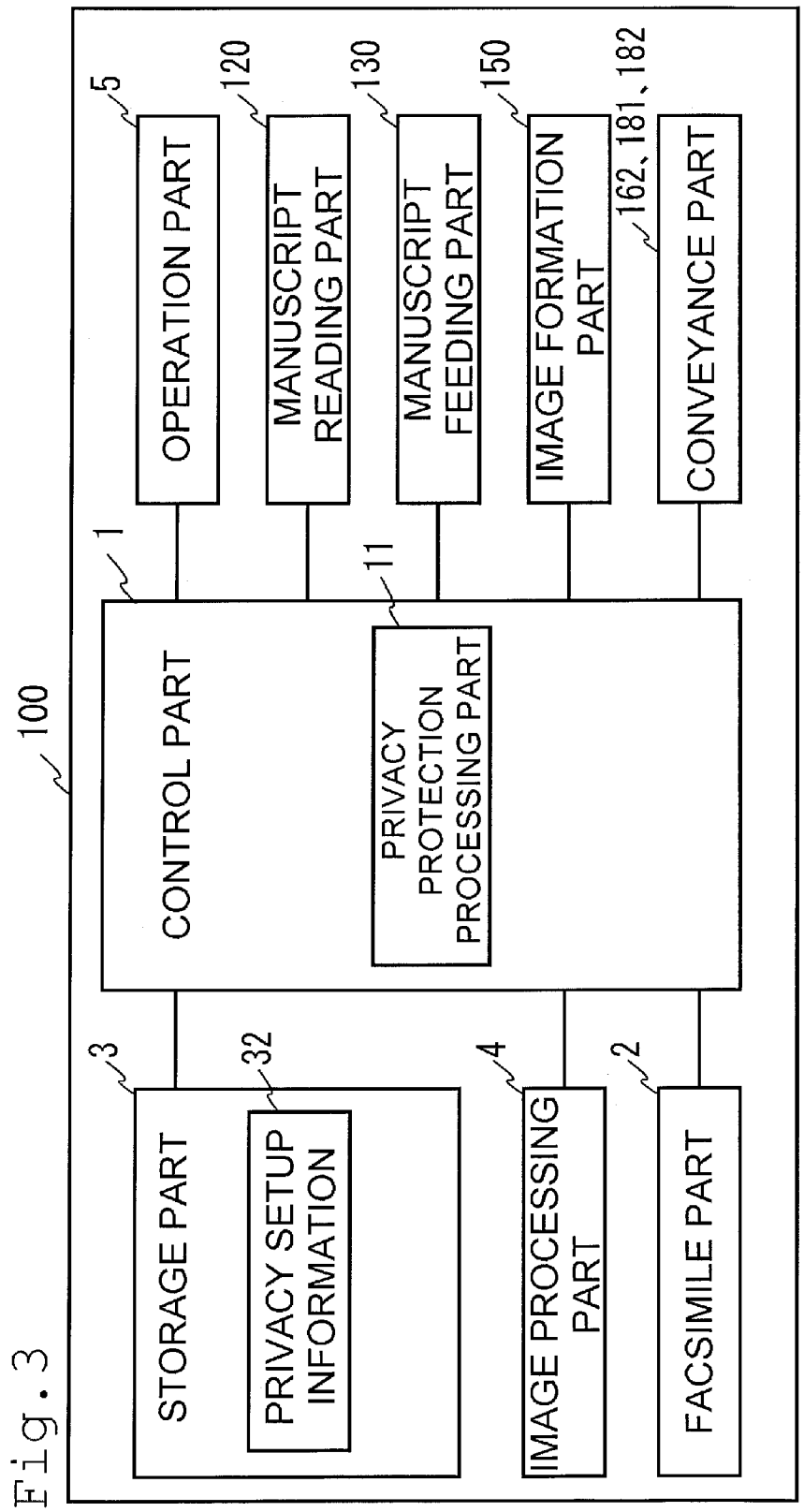
FIG. 3 is a figure showing a schematic structure figure of the image forming apparatus shown in FIG. 1.

As shown in FIG. 3, operation part 5, manuscript reading part 120, manuscript feeding part 130, image formation part 150, and the conveyance part (feed roller 162, conveying roller 181, ejection roller 182) of image forming apparatus 100 are connected to control part 1. As for each part, operation is controlled by control part 1. Facsimile part 2, storage part 3, and image processing part 4 are connected to control part 1.

Facsimile part 2 includes the modem. Facsimile part 2 has facsimile transmitting function and facsimile reception function. The facsimile transmitting function is function that generates a facsimile signal and transmits the generated facsimile signal via networks, such as a telephone network, from image data. These image data is the image data read by manuscript reading part 120 or image data memorized by storage part 3. The facsimile reception function is a function to receive a facsimile signal via networks, such as a telephone network.

Storage part 3 is a non-transitory recording medium with which a confidential box, an address book, user information, or the like, are memorized. The image data that read the manuscript and got by manuscript reading part 120, and the image data received by facsimile part 2 are stored in the confidential box. The contact or the like. are stored in the address book. User information is information of the user who logs in to image forming apparatus 100. Privacy setup information 32 is memorized by storage part 3. Privacy setup information 32 is information for setting up the privacy information used as a privacy protection object.

FIG. 4 is a figure showing the example of a setting of privacy setup information 32. In privacy setup information 32, a privacy information name and a user name (permission user) relate, and are memorized. A privacy information name shows a privacy protection object. A user name shows an accessible user to this privacy information. Here, the confidential box, the address book (customer group A), and the address book (in-company group) are memorized as a privacy protection object. Users A and C are memorized as an accessible user in the confidential box. User A is memorized by the address book (customer group A) as an accessible user. User A-C is memorized by the address book (in-company group) as an accessible user. A user can set up privacy setup information 32 via operation part 5. Contact information, including a name, an address, a telephone number, a mail address, or the like, may be set up as privacy information.

Control part 1 is an information processing part having a non-transitory recording medium. The control program for carrying out motion control of image forming apparatus 100 is memorized in the recording medium. Control part 1 reads the control program memorized by the recording medium, and makes it expand. Thereby, control part 1 controls a whole device according to the predetermined instructions information inputted from operation part 5. Control part 1 functions as privacy protection processing part 11. When display operation of the privacy information set in privacy setup information 32 is performed, privacy protection processing part 11 verifies a user's access permission, and performs a privacy protection process.

Figure 5:
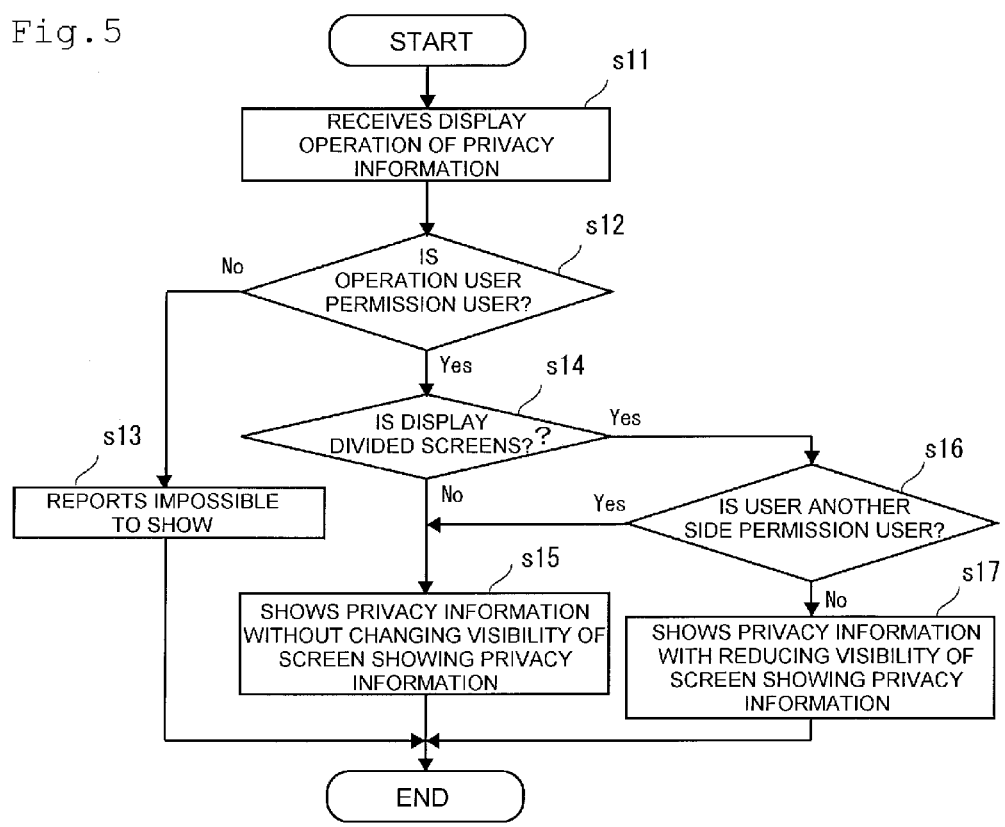
FIG. 5 is a figure showing a process flow of a privacy protection processing part shown in FIG. 3.

In detail, as refer to FIG. 5, a privacy protection process flow is explained. In addition, the user logins to image forming apparatus 100 as follows.

Control part 1 accepts the display operation of privacy information in operation part 5 (Step s11). Then, control part carries out the privacy protection process by privacy protection processing part 11. Privacy protection processing part 11 judges whether or not the user who operates display operation of privacy information is a permission user with reference to privacy setup information 32 (Step s12).

In case that the user who carried out display operation is not a permission user (No in Step s12), privacy protection processing part 11 reports showing privacy information (Step s13), and ends the present process.

On the other hand, in case that the user who carried out display operation is a permission user (Yes in Step s12), privacy protection processing part 11 judges whether a screen is during a divided display in display 51 (Step s14). In case that the screen is not divided display (No in Step s14), privacy protection processing part 11 does not change the visibility of the screen showing screen of privacy information. Privacy protection processing part 11 displays privacy information by the normal showing condition that is a displaying condition in case of displaying information of im-privacy information (Step s15), and ends the present process.

In case that a screen is during a divided display (Yes in Step s14), privacy protection processing part 11 refers to the privacy setup information 32. Privacy protection processing part 11 judges a user operates one divided display differ from another display that is operated the privacy information (another user) is permission user of privacy information or not.

In case that the user of another side is a permission user (it is Yes at Step s16), privacy protection processing part 11 does not change the visibility of the screen showing privacy information. Then, privacy protection processing part 11 displays privacy information by the normal displaying condition (Step s15), and ends the present process. Although the user of another side did not necessarily show privacy information, the user can show the privacy information.

On the other hand, in case that the user of another side is not a permission user (it is No at Step s16), privacy protection processing part 11 controls display 51 for the visibility of the screen showing privacy information to reduce from the normal displaying condition. Besides, privacy protection processing part 11 displays privacy information (Step s17), and ends the present process.

Figure 6A:
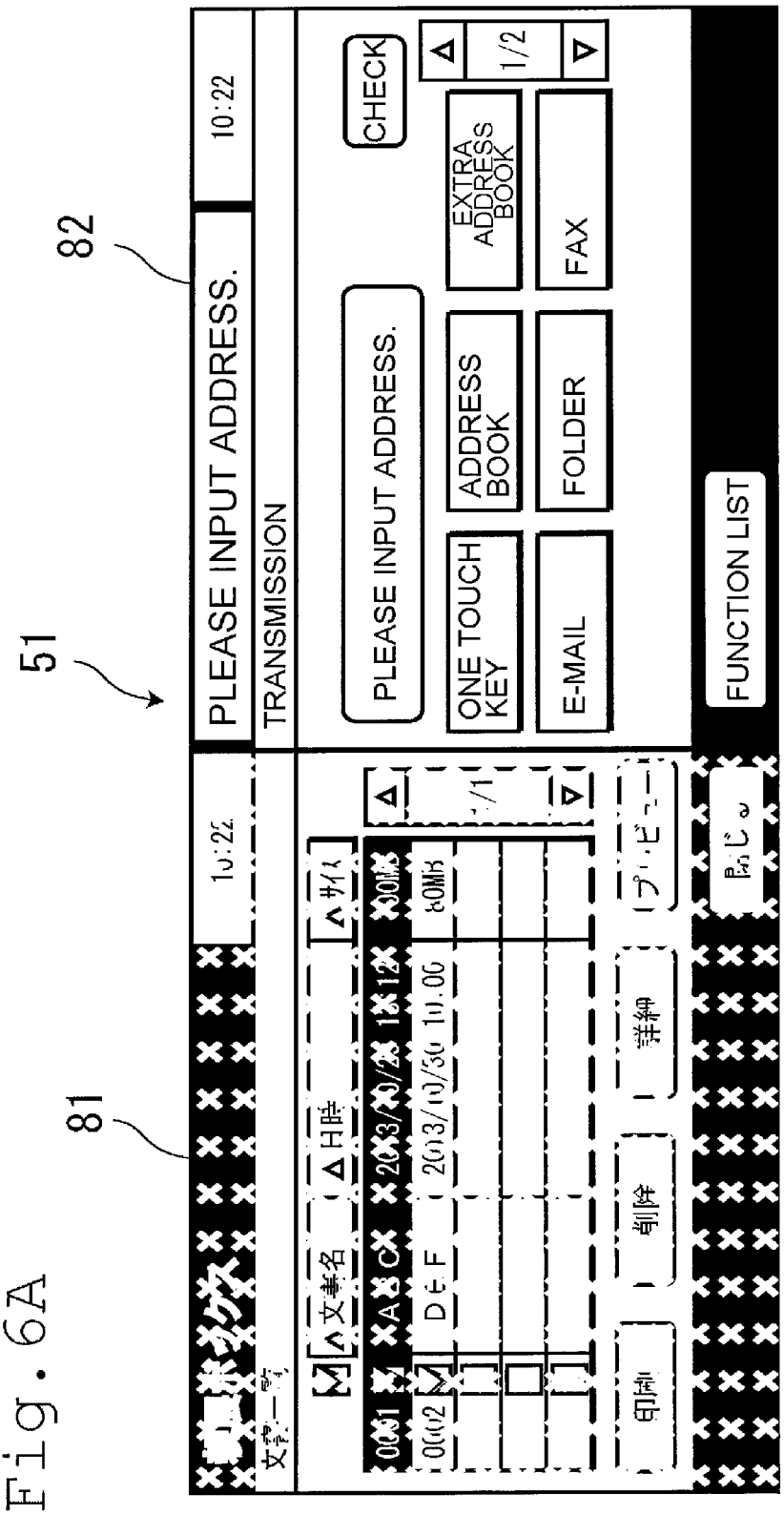
FIG. 6A is a figure showing an appearance of a screen by which privacy protection is performed.

FIG. 6A is a figure showing signs that the visibility of the screen showing privacy information is reduced. In FIG. 6A, the screen of display 51 is divided into two as right-or-left. Confidential box screen 81 is displayed on left side. Destination input screen 82 is displayed on right side. Confidential box screen 81 is a screen showing a document list of a confidential box that performed facsimile reception. As for this scene, a display is operated by user A. Destination input screen 82 is a screen that accepts the destination input of facsimile transmission. In this screen, a display is operated by user B. According to privacy setup information 32 shown in FIG. 4, although the right to access is granted to user A, as for confidential box screen 81 displayed by user A, and the right to access is not granted to user B. Confidential box screen 81 is shown in the state where the contrast of the screen was lowered and visibility reduced since it is such privacy information. On the other hand, destination input screen 82 displayed by user B is not set as privacy setup information 32 shown in FIG. 4 as privacy information. Accordingly, destination input screen 82 is shown as the normal displaying condition to that visibility is not reducing.

FIG. 6B is a figure showing the case where confidential box screen 81 is displayed by user A, and address book (in-company group) screen 83 is displayed by user C. Address book (in-company group) screen 83 is a screen showing the contact list of the in-company group of the address book. Address book (in-company group) screen 83 is set up as privacy information by privacy setup information 32 shown in FIG. 4. The display permission of confidential box screen 81 and the address book (in-company group) screen 83 is performed to users' A and C two men by each. Accordingly, any screen is displayed in the state where visibility does not be reduced.

As explained above, privacy protection processing part 11 displays the privacy information to that one user was set previously, while a different user is operating each of the divided screen. At this time, privacy protection processing part 11 verifies whether the user of another side has the right to access over that privacy information. Privacy protection processing part 11 is reducing the visibility of the screen showing the privacy information, in case that the user of another side does not have the right to access. Therefore, according to the present embodiment, it can prevent the privacy information that one user displayed being seen by the user of another side. Thus, privacy can be protected.

That is, in prior art, when a different user operated each of a split screen, the privacy information that one user displayed had been in sight of the user of another side.

In case that a different user operates each of the screen by which the divided display was performed according to the present disclosure, the technology that can protect the privacy of the contents showing screen that is divided can be provided.

The present disclosure is not limited to the embodiment mentioned above, and it cannot be overemphasized that it can change of all sorts in the range that does not deviate from the aim of the present disclosure.

For example, in the above-mentioned embodiment, privacy protection processing part 11 controlled display 51 to lower the contrast of the screen on which privacy information is displayed, and reduced the visibility of the screen. However, it is not limited to this. For example, display 51 may be controlled so that the brightness of the screen on that privacy information is displayed becomes low, and the visibility of a screen may be reduced.

Display 51 may have an angle-of-visibility control filter for every viewing area when a divided display is performed. The angle-of-visibility control filter is provided in the display surface of display 51, and has the following functions. The angle-of-visibility control filter displays a netted form pattern or the like. except for a front direction at the time of ON, and narrows an angle of visibility. The angle-of-visibility control filter is displayed by a wide viewing angle at the time of OFF. In this case, privacy protection processing part 11 controls a display by the normal displaying condition, and turns OFF an angle-of-visibility control filter. When showing privacy information, privacy protection processing part 11 controls a display, and turns ON an angle-of-visibility control filter. Thereby, privacy protection processing part 11 may reduce the visibility of a screen. A user may set up a contrast level, a luminance level, and an angle-of-visibility level when reducing the visibility of a screen. That is, it may be adjustable in the fall degree of the visibility of a screen.

Privacy protection processing part 11 does not need to control display 51 to reduce the visibility of the whole screen on which privacy information is displayed. That is, privacy protection processing part 11 may control display 51 to reduce the visibility of only the viewing area showing privacy information. Privacy protection processing part 11 may control display 51 so that "*" or the like turns down privacy information and visual recognition makes it displaying with a character impossible. While reducing the visibility of the screen on which privacy information was displayed, privacy protection processing part 11 may control display 51 to return the visibility of a screen to the normal displaying condition, for example, when prescribed operation is carried out. This prescribed operation may be operation of the unillustrated visibility fall release key being pressed.

What is claimed is:

1. An image forming apparatus having:
   a display comprising a screen that can be divided to show a first screen area and a second screen area to which can independently be logged in by different users and simultaneously accept operations there from;
   an information processor;
   a non-transitory recording medium comprising:
      user information of a plurality of users that can log in to the image forming apparatus;
      a privacy protection object; and
      privacy setup information that designates at least one user of the plurality of users as an accessible user of the privacy protection object; and
   a control program, stored in a non-transitory recording medium of the image forming apparatus, wherein the control program causes the information processor to:
      a) receive an operation to display the privacy protection object on the first screen area of the divided screen;
      b) determine whether the user of the first screen area is designated as an accessible user of the privacy protection object;
      c) if it is determined that the user of the first screen area is not designated as an accessible user of the privacy protection object, control the display to report that the privacy protection object cannot be displayed;
      d) determine whether the user of the second screen area is designated as an accessible user of the privacy protection object;
      e) if it is determined that the user of the first screen area is designated as an accessible user of the privacy protection object and the user of the second screen area is not designated as an accessible user of the privacy protection object, control the display to reduce a visibility of the first screen area from a normal displaying condition; and
      f) if it is determined that the user of the first screen area is designated as an accessible user of the privacy protection object and the user of the second screen area is designated as an accessible user of the privacy protection object, control the display to provide the visibility of the first screen area as the normal displaying condition.

2. The image forming apparatus according to claim 1, wherein
   the display has an angle-of-visibility control filter that controls an angle of visibility for each of the first screen area and the second screen area of the divided screen; and
   the control program controls the display to narrow the angle of visibility of the first screen area by the angle-of-visibility control filter.

3. The image forming apparatus according to claim 2, wherein
   the angle of visibility that occurs following said narrowing is adjustable.

4. The image forming apparatus of claim 1, wherein the control program further causes the information processor to:
   a) receive an operation to display on the second screen area of the divided screen, an object other than the privacy protection object; and
   b) control the display to not reduce a visibility of the second screen area from a normal displaying condition.

5. The image forming apparatus of claim 1, wherein the control program further causes the information processor to:
   a) receive an operation to display the privacy protection object when the screen is not divided; and
   b) not reduce the visibility of the screen from a normal displaying condition.

6. A control method of an image forming apparatus having:
   a display comprising a screen that can be divided to show a first screen area and a second screen area to which can independently be logged in by different users and simultaneously accept operations there from; and
   a non-transitory recording medium comprising:
      user information of a plurality of users that can log in to the image forming apparatus;
      a privacy protection object; and
      privacy setup information that designates at least one user of the plurality of users as an accessible user of the privacy protection object;
   the method comprising the steps of:
      a) receiving an operation to display the privacy protection object on the first screen area of the divided screen;
      b) determining whether the user of the first screen area is designated as an accessible user of the privacy protection object area;
      c) if it is determined that the user of the first screen area is not designated as an accessible user of the privacy protection object, controlling the display to report that the privacy protection object cannot be displayed;
      d) determining whether the user of the second screen area is designated as an accessible user of the privacy protection object area;
      e) if it is determined that the user of the first screen area is designated as an accessible user of the privacy protection object and the user of the second screen area is not designated as an accessible user of the privacy protection object, controlling the display to reduce a visibility of the first screen from a normal displaying condition; and
      f) if it is determined that the user of the first screen area is designated as an accessible user of the privacy protection object and the user of the second screen area is designated as an accessible user of the privacy protection object, controlling the display to provide the visibility of the first screen area as the normal displaying condition.

7. The control method of claim 6, further comprising the steps of:
   a) receiving an operation to display on the second screen area of the divided screen, an object other than the privacy protection object; and
   b) controlling the display to not reduce a visibility of the second screen area from a normal displaying condition.

8. The control method of claim 6, further comprising the steps of:
   a) receiving an operation to display the privacy protection object when the screen is not divided; and
   b) not reducing the visibility of the screen from a normal displaying condition.

* * * * *